3,523,915
ELECTRICALLY CONDUCTIVE CERAMIC MATERIAL AND METHOD OF PREPARATION
Anne Marie Anthony, Meudon, and David Yerouchalmi, Issy-les-Moulineaux, France, assignors to Commissariat a l'Energie Atomique, Paris, France
Filed Mar. 15, 1967, Ser. No. 623,309
Claims priority, application France, Mar. 21, 1966, 54,359
Int. Cl. H02n 4/00; H01b 1/08
U.S. Cl. 252—513                                   7 Claims

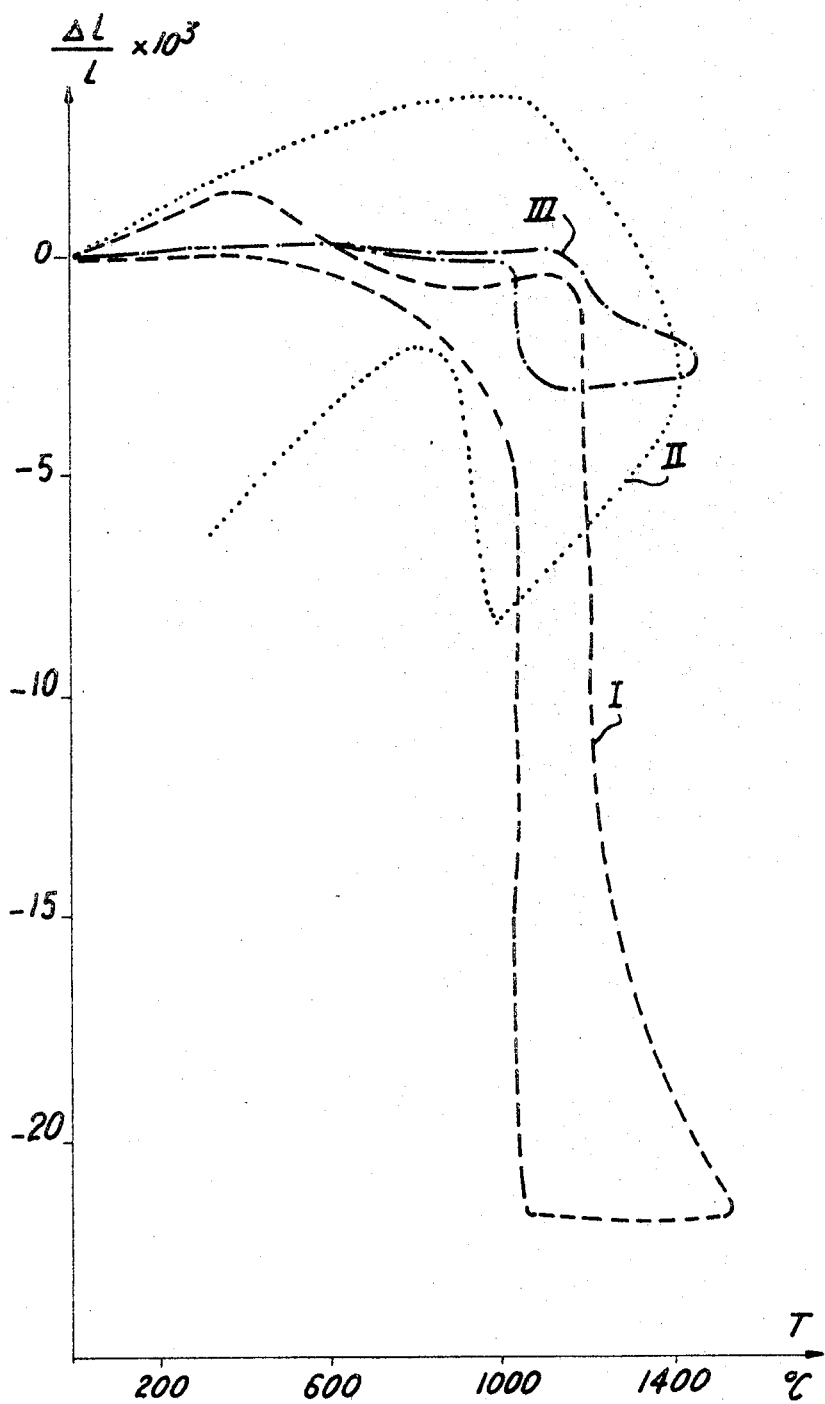

ABSTRACT OF THE DISCLOSURE

Electrically conductive ceramic material as primarily intended for use in the fabrication of electrodes of the type employed in magnetohydrodynamic conversion channels and consisting of monoclinic zirconia associated with one or a number of refractory ceramic materials, such as strontium, calcium or barium zirconates, having electronic conductivity and also with a refractory metal.

---

This invention relates to an electrically conductive ceramic material which is primarily intended to be employed in the fabrication of electrodes for use in magnetohydrodynamic conversion ducts.

The frontal faces of electrodes which are inserted in the duct wall of a magnetohydrodynamic (MHD) generator are subjected to the action of high-temperature oxidizing gases (2000 to 3000° K.) which circulate at high velocities. Said gases are "seeded" with alkali metal and thus become ionized, thereby producing an electromotive force and a direct current when a magnetic field is applied at right angles to the path of said gases in a direction parallel to the faces of the electrodes.

Said electrodes must therefore be capable of withstanding exacting operating conditions arising from the presence of the hot seeded gases as well as the passage of direct current of high intensity, and consequently from electrolytic phenomena which occur under such conditions in any conductor of the ionic type. In particular, electrodes of this type must have good pyroscopic resistance, high resistance to oxidation, to chemical corrosion, to erosion and to physicochemical stresses.

In the development of a process for the fabrication of such electrodes, some consideration has been given to the use of refractory oxides such as zirconia or thoria which are stabilized with a predetermined percentage of calcium oxide, yttrium oxide or rare-earth oxide. These stabilizing oxides create within the crystal lattice structures of zirconia or thoria ion vacancies which render such oxides conductive at high temperature. Thus, zirconia which is stabilized with either calcium oxide or yttrium oxide is electrically conductive at and above 1500° C. in respect of proportions of stabilizers in the vicinity of 10 mole percent.

However, the ionic character of the conductivity thus obtained is such that an electrode which is stabilized at a direct-current potential, as is the case with MHD conversion, is subjected more or less rapidly to electrolytic action which modifies the chemical constitution of the element as a whole and therefore its ceramic cohesion, thus leading to its ultimate destruction.

On the other hand, high-purity zirconia has an electron conduction mechanism and would undoubtedly be the ideal material for the fabrication of electrodes for MHD conversion ducts were it not for the fact that, at a temperature of about 1400° K., it undergoes a transformation of crystal lattice structure which is accompanied by an abrupt variation in the coefficient of linear expansion, thus resulting in crack formation in the ceramic parts which are formed of this oxide.

The authors of the present patent application have sought to prevent the destructive effects arising from the conversion of zirconia from one crystal form to another when heated to high temperatures.

The aim of this invention is to provide a novel electrically conductive ceramic material which essentially consists of monoclinic zirconia associated with one or a number of refractory ceramic materials having good electronic conductivity.

The refractory ceramic material or materials perform the function of "diluents" which permit the expansion of the zirconia without thereby causing the destruction of ceramic bodies. The ceramic material thus provided has an electronic conductivity at a direct-current potential of long duration which is virtually unmodified in time.

The refractory ceramic materials associated with monoclinic zirconia are constituted by the zirconates such as, for example, strontium zirconate, and the zirconates of calcium or barium.

Strontium zirconate has the advantage of being a highly stable and well-defined compound having good electrical conductivity up to a temperature of the order of 1900° K. Above this temperature, its electrical conductivity increases but remains electronic, and the same applies to monoclinic zirconia which is nevertheless conductive at lower temperatures. By mixing strontium zirconate $SrZrO_3$ and monoclinic zirconia $ZrO_2$ in suitable proportions, a sintered compound is thus obtained in which the variations in volume of monoclinic zirconia which is converted to quadratic and conversely are reduced as a result of its association with strontium zirconate. This association between monoclinic zirconia and the zirconate results in ceramic parts which are both homogeneous and sound, as well as having an electronic conductivity which is already appreciable at a temperature of 1600° K. (5 to 10 mhos./meter). By way of example, mixtures in the following proportions: 95, 90, 85, 80, 70, 60 mole percent of $SrZrO_3$ or of $CaZrO_3$ in the case of 5, 10, 15, 20, 30 and 40 mole of $ZrO_2$ have given good results.

According to a particular provision of the invention, there is added to the mixture of monoclinic zirconia and refractory ceramic material small proportions of refractory metals which have a sufficiently high resistance both to high temperature and to oxidation such as nickel, chromium, titanium. These addition elements which virtually constitute small proportions of impurities have the effect of increasing the electrical conductivity of the ceramic material, as well as facilitating the sintering process and permitting of better cohesion of the whole. These metals are to be added to the monoclinic zirconia/strontium zirconate mixture in proportions which are generally comprised between 0.5 and 2%. In a preferential manner, the monoclinic zirconia, the strontium zirconate or the calcium zirconate and the metal are mixed in proportions of 40 mole percent in the case of monoclinic zirconia, 60 mole percent in the case of strontium zirconate and 1 percent by weight of the previous mixture in the case of the metal.

The preparation of the ceramic material in accordance with the invention can be carried out in different ways.

Firstly, and in each case, it is necessary to grind each of the starting products in an alumina ball mill to a particle size of less than or equal to 5 microns, and to mix the ground powders intimately in well-defined proportions first by re-grinding the mixture in the ball mill then in a counterflow mixer.

In a first mode of execution, the powders which are moistened with 4–5% water receive an addition of an organic agglomerate and are compacted in a steel mold having the desired shapes under a pressure of 1 to 5 tonnes/cm.$^2$. The pressed parts are then sintered in an air furnace to a temperature of 1750° C.

In a second mode of execution, the same powders are compacted in an isostatic press, then sintered as indicated in the foregoing.

In a third mode of execution, the powders are fused in an arc or plasma furnace at 2500–3000° C. and poured off into a mold of special foundry sand.

There have been shown in the accompanying figure the variations of the coefficients of expansion of pure zirconia and of ceramic materials in accordance with the invention. Curve (I) represents the variation of the coefficient of expansion of pure zirconia, curve (II) represents the variation of the coefficient of expansion of a ceramic material consisting of 60% strontium zirconate, 40% zirconia and 1% nickel, and curve (III) represents the variation of the coefficient of expansion of a ceramic material consisting of 90% calcium zirconate and 10% zirconia. Curve (I) shows the sudden variation of the linear coefficient of expansion of pure zirconia at a temperature higher than 1000° C. whereas the ceramic materials in accordance with the invention have good dimensional stability.

What we claim is:

1. A ceramic mixture suitable for sintering and making electrodes in a magnetohydrodynamic conversion duct consisting essentially of monoclinic zirconia mixed with at least one refractory ceramic material having electronic conductivity selected from the group consisting of strontium zirconate, calcium zirconate and barium zirconate, the mole percent of zirconia being between 5 and 40 and the mole percent of the refractory ceramic material being between 95 and 60.

2. A ceramic material in accordance with claim 1 including between 0.5 to 2% by weight of the zirconia/zirconate ceramic mixture of a refractory metal selected from the group consisting of nickel, chromium and titanium.

3. A ceramic material in accordance with claim 2 consisting of monoclinic zirconia, strontium zirconate and a refractory metal in proportions 40 mole percent for the monoclinic zirconia, 60 mole percent for the strontium zirconate and 1 percent by weight of the mixed monoclinic zirconia and strontium zirconate of a refractory metal selected from the group consisting of nickel, chromium and titanium.

4. A ceramic material in accordance with claim 2 consisting of monoclinic zirconia, calcium zirconate and a refractory metal in proportions of 40 mole percent for the monoclinic zirconia, 60 mole percent for the calcium zirconate and 1 percent by weight of the mixture of monoclinic zirconia and calcium zirconate of a refractory metal selected from the group consisting of nickel, chromium and titanium.

5. A method of preparing a ceramic electrode composition for use in a magnetohydrodynamic conversion duct comprising the steps of grinding monoclinic zirconia in mole percent between 5 and 40 and at least one refractory ceramic material having electronic conductivity selected from the group consisting of strontium zirconate, calcium zirconate and barium zirconate in mole percent between 95 and 60 to a particle size less than or equal to 5 microns, mixing the ground powders, adding water and an organic agglomerate, compacting the mixed powders and agglomerate in a mold under a pressure of 1 to 5 tons per square centimeter and then sintering the compact in an arc furnace to a temperature of about 1750° C.

6. A method of preparation of ceramic material in accordance with claim 5, the mixture of powders being compacted in an isostatic press and sintered in air up to a temperature on the order of 1750° C.

7. A method of preparation of ceramic material in accordance with claim 5, the powders being fused in an arc furnace or plasma furnace at a temperature between 2500 and 3000° C. and then cast in a mold of foundry sand.

References Cited

UNITED STATES PATENTS 2,724,070  11/1965  Heine et al. _____ 313—337

FOREIGN PATENTS 594,020    9/1963  Great Britain.
1,342,052  9/1963  France.
1,452,620  1966    France.
1,430,340  1/1966  France.

JOHN DAVID WELSH, Primary Examiner

U.S. Cl. X.R.

106—57; 252—520, 521; 310—10; 313—218